Jan. 5, 1971     J. C. FICI     3,552,058
PLANTER WITH RESERVOIR
Filed April 22, 1968     2 Sheets—Sheet 1

INVENTOR
JAMES C. FICI
BY
ATTORNEYS

United States Patent Office 3,552,058
Patented Jan. 5, 1971

3,552,058
PLANTER WITH RESERVOIR
James C. Fici, 310 South Drive,
Rochester, N.Y. 14612
Filed Apr. 22, 1968, Ser. No. 723,025
Int. Cl. A01g 27/00
U.S. Cl. 47—38                                    2 Claims

ABSTRACT OF THE DISCLOSURE

A container has an internal shoulder between its top and bottom separating the upper soil-holding section of the container from the lower, reservoir section thereof. At least one, inverted, truncated-conical receptacle is removably seated on the shoulder to support the lower end of the receptacle just above the bottom of the container. A duct through the upper section of the container permits delivering water to the reservoir section, beneath the receptacle. The water seeps through a hole in the bottom of the receptacle, so that when the receptacle and the upper section are filled with soil, the soil in the receptacle is saturated to the level of the water in the reservoir, but the soil in the upper section draws water from the saturated soil by capillary action only as needed, therefore protecting any roots planted therein.

---

This invention relates to planters, and more particularly to a novel planter for use in the home, garden, cemetery, etc. to keep the plant or flowers therein moist for extended periods of time.

A major problem encountered heretofore with respect to the maintenance of household and garden variety plants has been the difficulty in keeping the plants adequately watered during the owner's absence. The soil in a conventional planter must be watered frequently if the plant contained therein is to survive. Under normal conditions, the average household plant must be watered every one to three days. For this reason, a vacationer may very often have to request his or her neighbor to water certain plants during the vacationer's absence. Moreover, in less frequented areas, as in cemeteries, for example, it is extremely difficult to keep plants watered and alive, unless a person can afford to pay to have a grave or graves periodically attended to by the professional gardeners employed by the cemetery.

Most conventional planters for growing plants as distinguished from fresh cut flowers, comprise simple containers having holes in the bottoms thereof to permit excess water to drain out. This prevents the plant roots from being rotted by excess water, but also means that the plant contained therein will not remain moist very long.

Efforts have been made to develop a novel planter having some form of reservoir for maintaining the associated plant moist for extended periods of time; but such prior planters have not proved to be satisfactory. A major fault of such prior planters, for example, is that the soil often becomes too saturated with water, and thereby the roots of the plant literally drown and rot.

It is an object of this invention to provide an improved planter having a novel reservoir that will supply a satisfactory quantity of moisture to the plant for extremely long periods of time.

Another object of this invention is to provide an improved planter having a reservoir that can be refilled readily, and which will supply controlled quantities of water to the roots of the plant contained in the planter.

A further object of this invention is to provide a novel planter of the type described, which is particularly adapted for garden use, and even more specifically for use in cemeteries at grave sites, and the like.

It is an object also of this invention to provide an improved planter of the type which has a reservoir, and which is substantially less expensive, but more reliable than prior such planters.

Other objects of the invention will be apparent hereinafter from the specification and from the recital of the appended claims, particularly when read in conjunction with the accompanying drawings.

Figure 1:
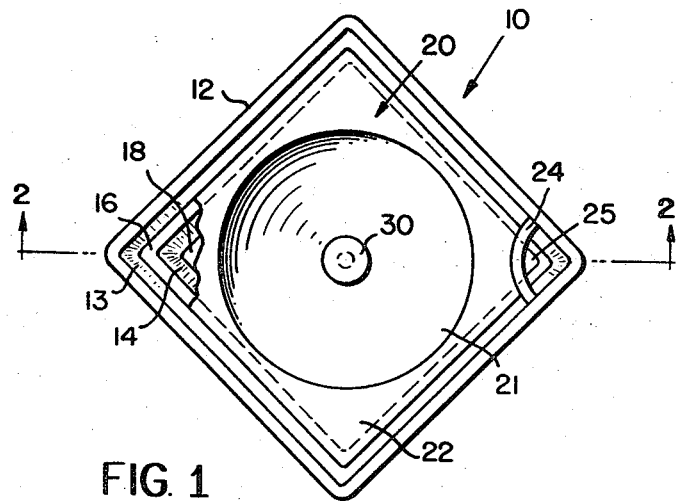
FIG. 1 is a plan view of the planter made in accordance with one embodiment of this invention, part of the planter being cut away.
Figure 2:
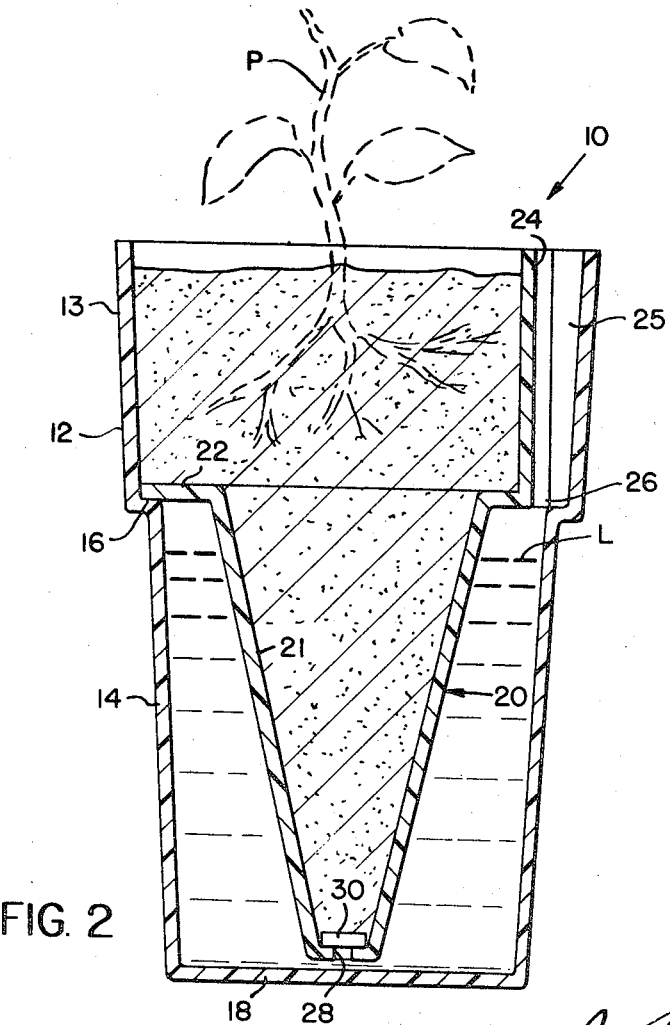
FIG. 2 is a sectional view of this planter taken along the line 2—2 in FIG. 1 looking in the direction of the arrows.

Referring now to the drawings by numerals of reference, and first to the embodiment illustrated in FIGS. 1 and 2, 10 denotes a planter comprising an outer receptacle 12, which is generally rectangular in cross section, and which has an upper section 13, and a lower section 14, the latter being of reduced cross sectional area. An internal shoulder 16 is formed in the housing at the junction of sections 13 and 14. Although section 13 is slightly larger in cross sectional area than section 14, it is of slightly less depth. Both sections taper downwardly so that their lower ends (FIG. 2) are slightly smaller than their upper ends. The bottom 18 of receptacle 12 is perfectly flat to provide a stable base for the planter.

Removably mounted in the receptacle 12 in an inverted, truncated-conical pot or receptacle 20 having a conical wall 21, which is surrounded at its upper end by an integral, lateral flange 22. Flange 22 seats around its perimeter on the shoulder 16 to support the lower end of the pot 20 just slightly up above the planter base or bottom 18.

Integral with or otherwise secured at its lower end to the upper surface of the flange 22 adjacent one corner thereof, and projecting vertically upwardly from the flange with its concave surface confronting one of the corners of section 13, is a conduit 24. The confronting surfaces of conduit 24 and of the section 13 define a filling spout or duct 25, which communicates at its lower end through a port or opening 26 (FIG. 2) in flange 22 with the lower section 14 of the planter.

Removably mounted in an opening 28 in the bottom of the receptacle 20 is the reduced diameter shank of a porous filter plug or insert 30.

In use, the pot 20 is placed in the receptacle 12 as shown in FIGS. 1 and 2, so that the upper section 13 of the planter is sealed off from the lower section 14 by the engagement of the flange 22 with the shoulder 16. The pot 20 and section 13 are then filled with soil; and a plant P (broken lines in FIG. 2) is planted in the soil so that its roots remain substantially within the upper section 13 of the planter. Water is then poured into the receptacle 12 through the duct 25, until the level L of the water in section 14 is just below the shoulder 16. The water in section 14 seeps through the porous plug 30 into the soil in the pot 20 so that this soil may become saturated, to a height corresponding to the height of water in section 14. The moisture of the soil in the insert 20 is drawn upwardly by capillary action into the soil in the upper section 13 of the planter, thereby providing moisture for the roots of the plant P. Because the section 13 is positioned above the level of the water in the section 14, the moisture content of the soil in section 13 does not become excessive. Instead the soil above the water level draws from the moist soil therebeneath only that quantity of water that is necessary to maintain the plant P alive. Under normal conditions it has been found that, when once the lower section 14 of an average size household-type planter 10 has been filled, the supply of water will be adequate to maintain the plant P sufficiently moist for approximately two weeks to eighteen days without requiring any additional watering of the plant.

The receptacle 12 and pot 20 can be made of any desirable material which is generally rigid and waterproof; but it is preferred that they be made of a polyethylene plastic, or the like, so that they will be light, but tough.

The conical shapes of the receptacle 12 and pot 20 permit several of the receptacles 12 and pots 20, respectively, readily to be stacked one within the other, to economize on space when they are packed for shipping. The conical wall portion 21 of pot 20 is of smaller cone angle than are the walls of section 13 and 14.

The plug 30 is designed not only to permit water to seep from section 14 into the lower end of the pot 20, but also to prevent dirt or soil from sifting out of the lower end of the pot into section 14.

Figure 3:
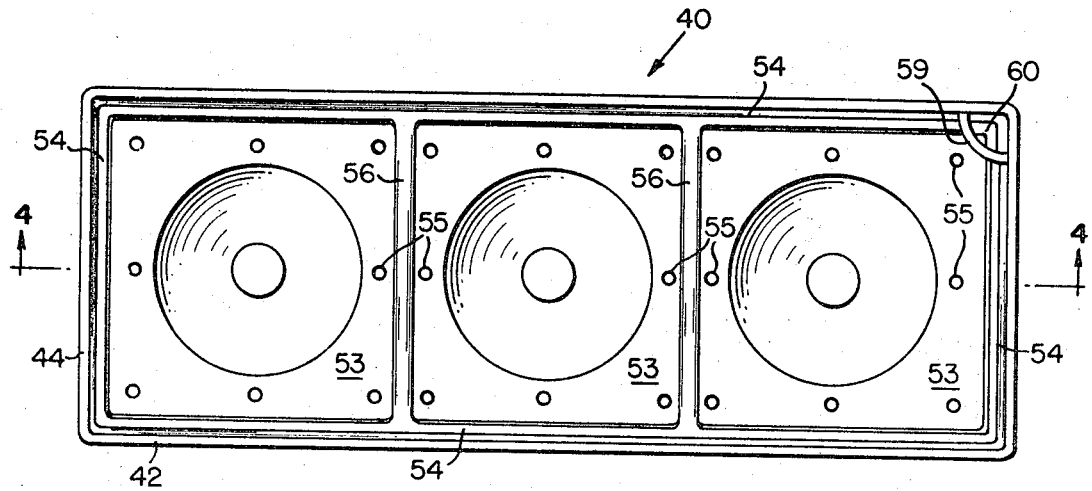
FIG. 3 is a plan view of a modified planter made in accordance with a second embodiment of this invention.
Figure 4:
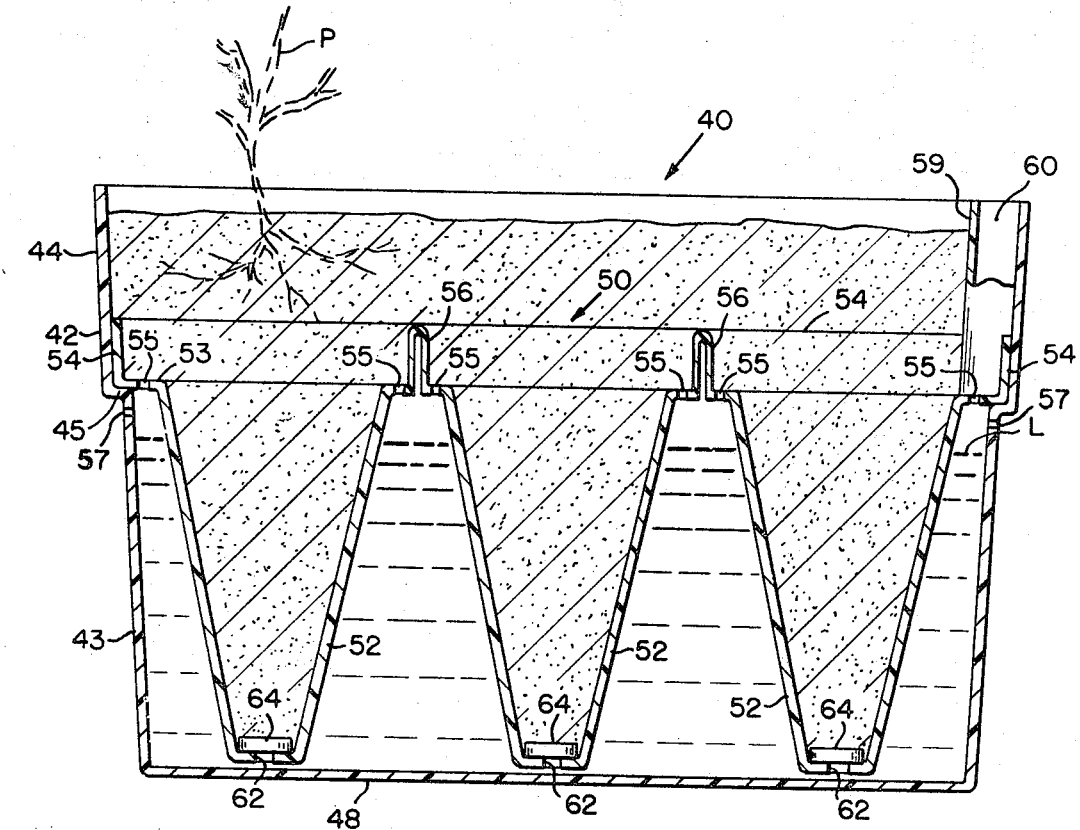
FIG. 4 is a sectional view of this modified planter taken along line 4—4 in FIG. 3 looking in the direction of the arrows.

Referring now to the embodiment illustrated in FIGS. 3 and 4, 40 denotes a generally rectangular planter comprising a receptacle 42, which is approximately three times as long as it is wide, and which has a relatively deep lower section 43 approximately as deep as the housing is wide, and a somewhat shallower upper section 44, which is slightly larger in cross sectional area than the lower section 43. As in the first embodiment, the bottom 48 of the receptacle 42 is flat, and an internal shoulder 45 is formed in the receptacle at the junction of sections 43 and 44.

Removably mounted in housing 42 is a plastic insert 50, comprising three integral, identical, inverted truncated-conical shaped vessels 52, which are held in side-by-side relation by an integral, horizontal web portion 53, which is removably seated adjacent its periphery upon the shoulder 45 in housing 42. The marginal edge of web 53, which is rectangular in configuration, is turned upwardly (FIG. 4) to form a vertical, perimetric flange 54, which abuts the inner surface of housing section 44 above shoulder 45. Between adjacent vessels 52 the web 53 is folded upwardly to form rigid ribs 56, which extend transversely.

Around the upper ends of receptacles 52 the horizontal portions of web 53 have therethrough a plurality of holes 55.

Integral at its lower end with one corner of the web 53, and projecting upwardly therefrom with its concave surface confronting the adjacent corner of housing section 44 is an arcuate wall 59. Wall 59 cooperates with the adjacent corner of housing section 44 to define a vertical spout or duct 60, which communicates at its lower end through a registering opening or port in web 53 with the interior of the lower housing section 43.

Each vessel 52 has in its lower end an opening 62 in which is mounted the reduced diameter shank of a porous filter insert or plug 64, which is similar to the plug 30 in the first embodiment.

As in the first embodiment, housing 42 and insert 50 are preferably made from a relatively rigid, plastic material, such as polyethylene or the like.

In use the housing 42 may be planted in the ground, such as for example at a grave site in a cemetery, so that the ground level is slightly below the top of the housing. The insert 50 is then placed in the housing with the web 53 resting on the shoulder 45, so that the lower ends of vessels 52 are just slightly above the bottom 48 of the housing. The vessels 52 and the upper section 44 of the housing are then filled with soil, after which at least one plant P (broken lines in FIG. 4) is planted in the soil so that the roots of the plant, or plants, is or are positioned substantially within the soil contained in upper section 44. The lower section 43 of the housing is then filled with water, which is poured into the spout or duct 60 until the water level L in section 43 is at or just below the port in web 53, which is located at the bottom of the duct 60. The water level can be viewed quite readily through the duct 60. Since insert 50 seals the upper end of section 43, if too much water is poured into section 43, the duct 60 will overflow to indicate that section 43 is full.

The water in housing 43 seeps through the plugs 64 into the soil contained in the vessels 52, so that it may become substantially saturated to a height not exceeding the height of the water in section 43. This level, however, is normally substantially below the roots of the plants that are potted in the upper section of the housing, so that the plants are not damaged by the presence of too much water. Instead, capillary action provides the roots of the plants with just enough water, from the saturated soil beneath, to keep the plants healthy and alive.

When it rains, the spaced holes 55 in the horizontal portions of the web 53 permit excess rain water to drain downwardly into the lower section 43 of housing 42, so that the roots of the plants again are not subjected to excess moisture. Further overflow holes 57 in the upper end of section 43 just beneath shoulder 45 may be used to set the maximum water level L for this section.

From the foregoing it will be apparent that applicant has developed a relatively simple, inexpensive and reliable planter, which is capable of supplying adequate moisture to a plant, or plants, for extended periods of time, for example, in the case of the second embodiment several weeks or more, without requiring any periodical watering of the plants. Water is drawn upwardly by capillary action from the moist soil in the lower section of housing 10 or 40 to the upper section, which contains the plant roots. Since the roots of the plant or plants contained in applicant's novel planters are normally positioned above the saturation line of the soil in the conical vessels, the roots of the plants are protected from too much moisture.

The second embodiment (FIGS. 3 and 4), is particularly adapted for use in cemeteries, where it is often difficult to arrange for periodic watering of graveside plants. The planter housing 42 may be planted right in the ground, where it is inconspicuous. The ribs 56, and the flange 54 add considerable strength to the insert 50, so that it may withstand the tread of a person's foot, if it should accidentally be stepped upon; and by making the housing 42 and insert 50 out of polyethylene, they will be extremely resistant to deterioration even though they are planted in the ground. If desired the walls of the housing 42 may be tapered slightly, as in the case of the housing 12, so that a plurality of housings 42 and inserts 50, respectively, may be compactly stacked one within the other for shipping purposes.

While the invention has been described in connection with at least two specific embodiments thereof, it will be understood that it is capable of still further modification, and this application is intended to cover any variations, uses, or adaptations of the invention following, in general, the principles of the invention and including such departures from the present disclosure as come within known or customary practice in the art to which the invention pertains and may be applied to the essential features hereinbefore set forth, and as fall within the scope of the invention or the limits of the appended claims.

Having thus described my invention, what I claim is:

1. A self-watering planter, comprising:
   a first container open at its upper end, and having intermediate its ends an internal peripheral shoulder dividing said container into an upper section and a lower section, respectively,
   a second soil-supporting container in said first container removably and sealingly seated around its marginal edge on said shoulder and having therein a plurality of spaced, hollow, inverted, truncated-conical pockets adapted to hold soil, and projecting downwardly into said lower section of said first container in spaced relation thereto, and opening at their upper ends on said upper section of said first container, a plurality of spaced, parallel, inverted U-shaped ribs between the upper ends of said pockets and interconnecting same, and a vertical fill duct extending through said upper section and said second container for supplying water to said lower section of the first container exteriorly of said conical pockets, said first container having apertures therethrough adjacent the upper end of said lower section to establish an overflow system therefor, said second container having apertures therethrough adjacent the upper ends of said pockets to allow rain water to drain into said lower section, each of said conical pockets having in its lower end a small hole to permit water from said lower section to seep into the soil in said pockets, and said upper section of said first container projecting above said pockets having a larger cross-sectional area than said lower section, whereby when said upper section and said conical pockets are filled with soil, said upper section is large enough to accommodate a plurality of plants, the roots of which register with the pockets to receive moisture from the soil therein.

2. A self-watering planter as defined in claim 1 including a porous filter plug disposed in said hole in the bottom of each of said pockets.

References Cited

UNITED STATES PATENTS

| | | | |
|---|---|---|---|
| 1,221,449 | 4/1917 | Hitchcock | 47—38.1 |
| 1,631,409 | 6/1927 | Finn | 47—38.1 |
| 2,695,474 | 11/1954 | Barstow | 47—38.1 |
| 2,865,137 | 12/1958 | Longacre | 47—38 |
| 3,066,446 | 12/1962 | Buttinger | 47—38.1 |
| 3,137,096 | 6/1964 | Hopkins | 47—38 |

FOREIGN PATENTS

| | | | |
|---|---|---|---|
| 654,971 | 4/1965 | Belgium | 47—38.1 |
| 1,268,626 | 6/1961 | France | 47—34.13 |

ROBERT E. BAGWILL, Primary Examiner

U.S. Cl. X.R.

47—34.13